(12) United States Patent
Matsunobu et al.

(10) Patent No.: US 12,722,424 B2
(45) Date of Patent: Sep. 1, 2026

(54) NON-PNEUMATIC TIRE

(71) Applicant: Toyo Tire Corporation, Itami (JP)

(72) Inventors: Yuko Matsunobu, Itami (JP); Yusuke Yamamoto, Itami (JP)

(73) Assignee: Toyo Tire Corporation, Itami (JP)

( * ) Notice: Subject to any disclaimer, the term of this patent is extended or adjusted under 35 U.S.C. 154(b) by 390 days.

(21) Appl. No.: 18/526,265

(22) Filed: Dec. 1, 2023

(65) Prior Publication Data

US 2024/0208268 A1 Jun. 27, 2024

(30) Foreign Application Priority Data

Dec. 26, 2022 (JP) ................................ 2022-208138
May 11, 2023 (JP) ................................ 2023-078580

(51) Int. Cl.
*B60C 7/14* (2006.01)

(52) U.S. Cl.
CPC ............. *B60C 7/146* (2021.08); *B60C 7/143* (2013.01)

(58) Field of Classification Search
CPC ........... B60C 7/143; B60C 7/146; B60C 7/18; B60C 7/107
See application file for complete search history.

(56) References Cited

U.S. PATENT DOCUMENTS

2009/0173421 A1* 7/2009 Love ........................ B60C 7/18 152/11
2016/0200144 A1 7/2016 Iwamura et al.
2017/0136814 A1 5/2017 Abe et al.
2019/0070904 A1* 3/2019 Kitamura ................. B60C 7/14
2019/0070905 A1 3/2019 Kajiwara
2022/0203766 A1* 6/2022 Tahara ................... B60C 7/146

FOREIGN PATENT DOCUMENTS

JP 2013018462 A 1/2013
JP 2015101210 A * 6/2015
JP 2016130071 A 7/2016
WO 2019107305 A1 6/2019

OTHER PUBLICATIONS

Extended European Search Report issued on May 14, 2024, in corresponding European Application No. 23213330.6, 8 pages.

* cited by examiner

*Primary Examiner* — Kip T Kotter
(74) *Attorney, Agent, or Firm* — Maier & Maier, PLLC

(57) ABSTRACT

A tire includes an inside and an outside annular part, and a plurality of spokes, in which a pair of inside sloped faces approaching the outside annular part from both ends in a tire-width direction towards the tire-width direction center is formed at an outer circumferential part of the inside annular part opposing the outside annular part, a pair of outside sloped faces approaching the inside annular part from both ends in the tire-width direction towards the tire-width direction center is formed at an inner circumferential part of the outside annular part opposing the inside annular part, the spoke has an intermediate part extending between the inside annular part and the outside annular part, an inside connection part that connects the intermediate part and the inside annular part, and an outside connection part connecting the intermediate part and outside annular part, the inside connection part includes an inside continuous part.

20 Claims, 11 Drawing Sheets

NON-PNEUMATIC TIRE

This application is based on and claims the benefit of priority from Japanese Patent Application No. 2022-208138 and 2023-078580, respectively filed on 26 Dec. 2022 and 11 May 2023, the content of which is incorporated herein by reference.

FIELD

The present invention relates to a non-pneumatic tire.

BACKGROUND

In recent years, a non-pneumatic tire for which problems such as the occurrence of punctures does not occur, and which does not require inflation pressure has been developed. Non-pneumatic tires generally have a structure in which an outer circumferential side annular part to which tread is provided at the outer circumferential surface, and an inner circumferential side annular part arranged coaxially at the inner side of the outer circumferential side annular part are connected by a plurality of spokes arranged radially.

In this type of non-pneumatic tire, stress tends to concentrate at the connection portion of spokes to each annular part on the inner circumferential part and outer circumferential part, and the strength of this portion affects the durability of the tire. For example, Japanese Unexamined Patent Application, Publication No. 2016-130071 discloses a non-pneumatic tire which achieves an improvement in durability by defining the thickness, length, etc. of this connection portion.

SUMMARY

Japanese Unexamined Patent Application, Publication No. 2016-130071 discloses the possibility of an improvement in durability by the shape of the spokes; however, there is no mention of the durability of each annular part on the inner circumferential side and outer circumferential side, and there is room for improvement from the viewpoint of durability of the tire overall.

Therefore, the present invention has an object of providing a non-pneumatic tire enabling an improvement in durability as the tire overall.

A non-pneumatic tire according to the present invention includes: an inside annular part; an outside annular part disposed coaxially at an outer circumferential side of the inside annular part; a plurality of spokes connecting the inside annular part and the outside annular part, and arranged along a tire-circumferential direction; and a tread provided at an outer circumferential surface of the outside annular part, in which a pair of inside sloped faces approaching the outside annular part from both ends in a tire-width direction towards the tire-width direction center is formed at an outer circumferential part of the inside annular part opposing the outside annular part, a pair of outside sloped faces approaching the inside annular part from both ends in the tire-width direction towards the tire-width direction center is formed at an inner circumferential part of the outside annular part opposing the inside annular part, the spoke has an intermediate part extending between the inside annular part and the outside annular part, an inside connection part that connects the intermediate part and the inside annular part, and an outside connection part connecting the intermediate part and the outside annular part, the inside connection part includes an inside continuous part having a shape continuously linking to the inside sloped face, and the outside connection part includes an outside continuous part having a shape continuous to the outside sloped face.

According to the present invention, it is possible to provide a non-pneumatic tire enabling an improvement in durability as the tire overall.

BRIEF DESCRIPTION OF THE DRAWINGS

FIG. 3 is a partial perspective view of a non-pneumatic tire when viewing obliquely a portion shown in FIG. 2;

DETAILED DESCRIPTION OF THE EMBODIMENTS

Figure 1:
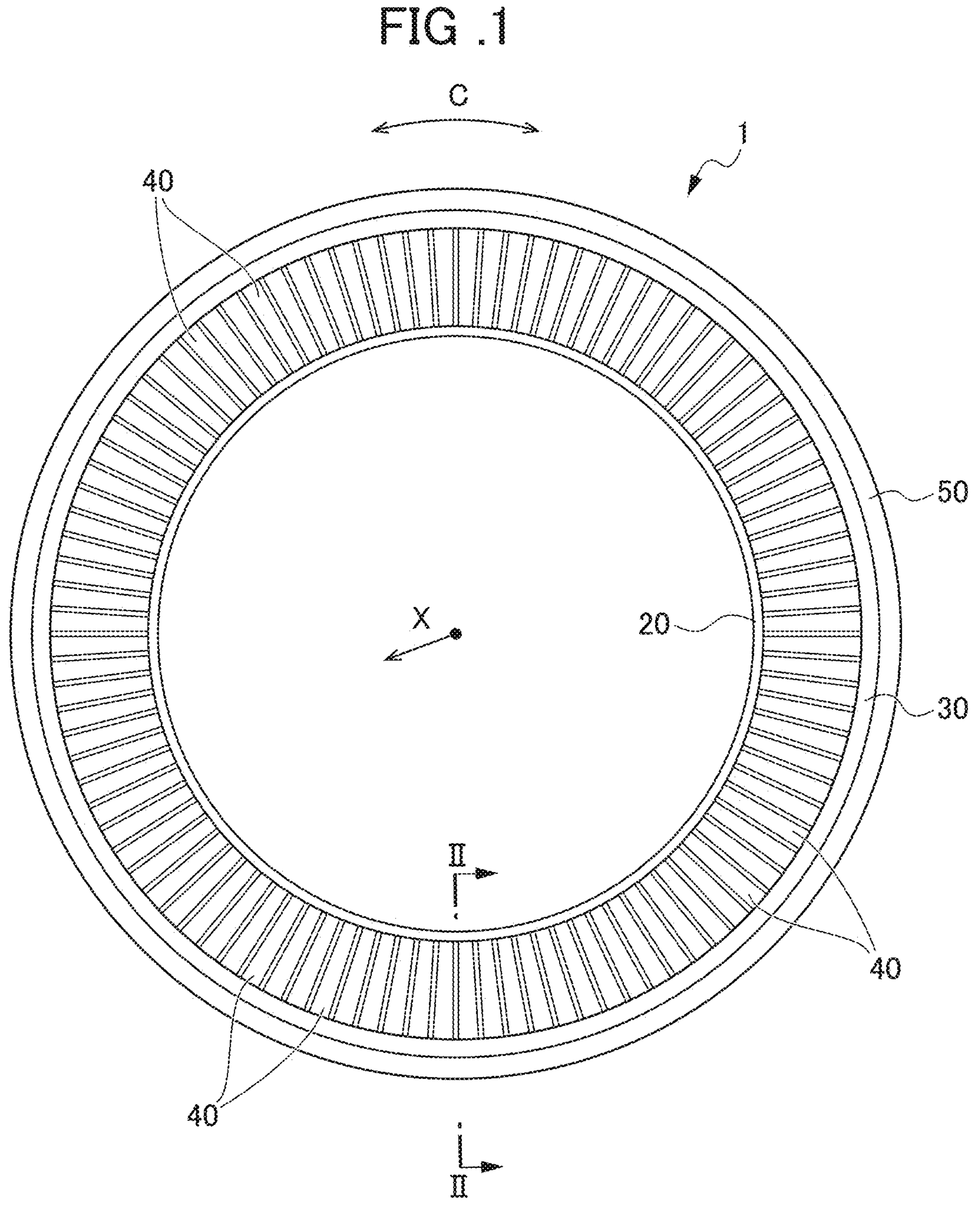
FIG. 1 is a side view showing a non-pneumatic tire according to an embodiment.
Figure 2:
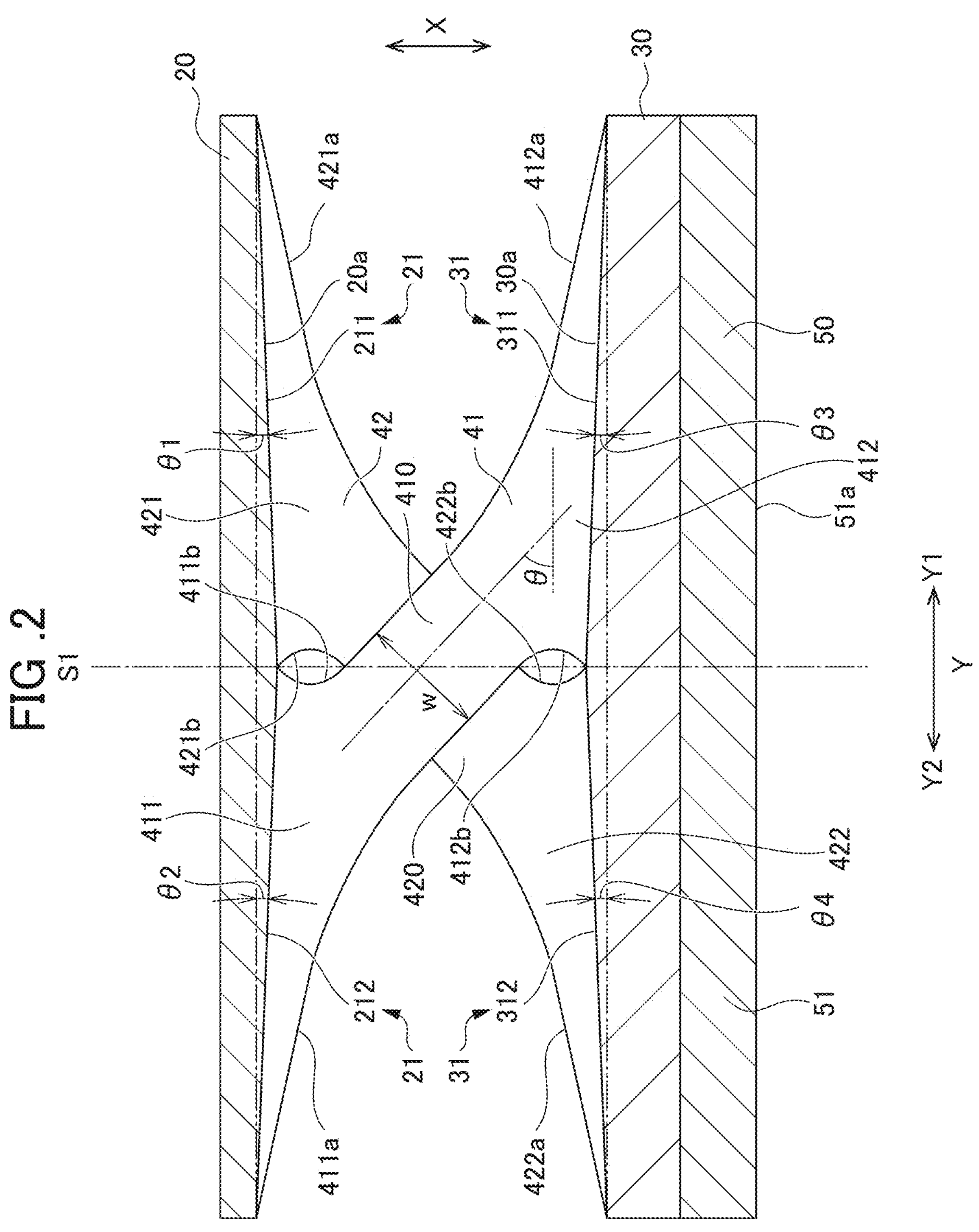
FIG. 2 is a cross-sectional view along the line II-II in FIG. 1.
Figure 3:
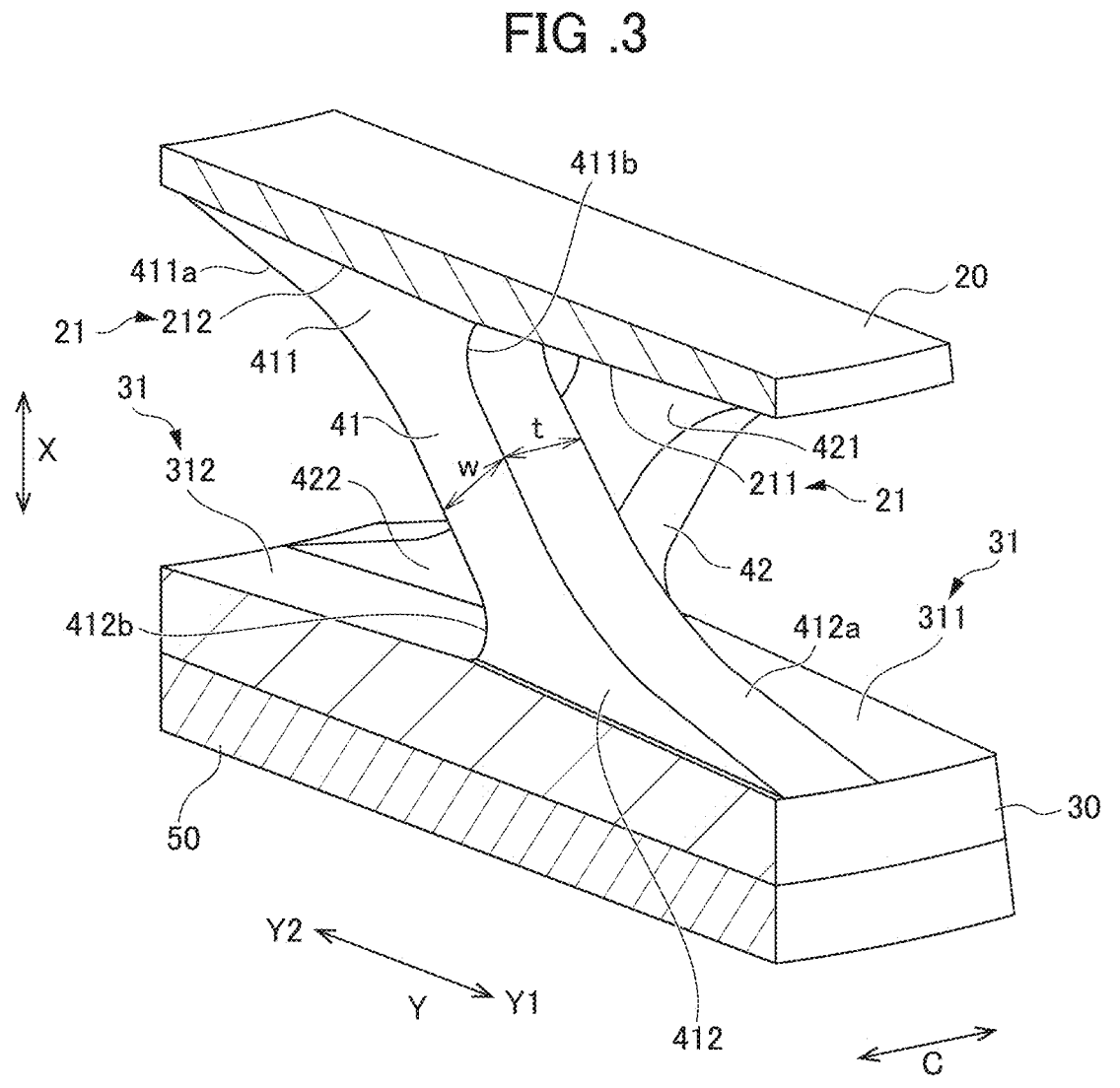
Figure 4:
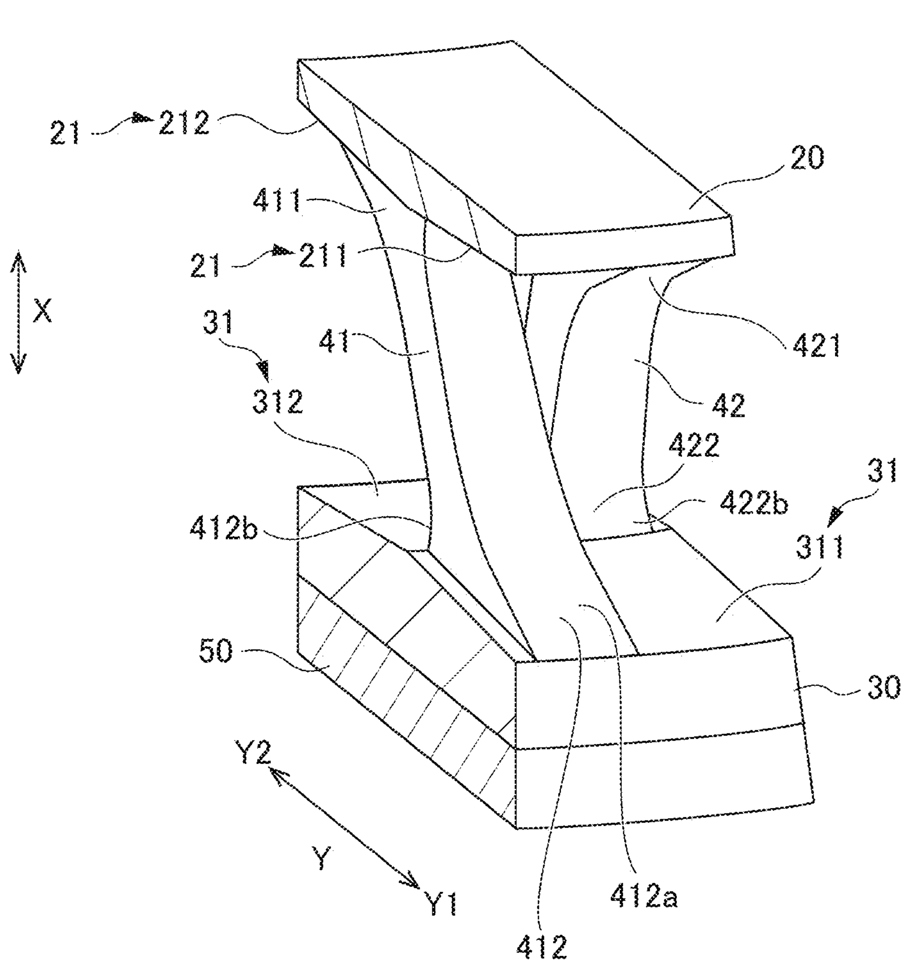
FIG. 4 is a partial perspective view of a non-pneumatic tire when viewing a portion shown in FIG. 2 from a different direction than FIG. 3.

Hereinafter, an embodiment will be explained while referencing the drawings. FIG. 1 is a side view looking at a tire 1, which is a non-pneumatic tire of the embodiment, from a direction parallel to a tire rotation axis (tire meridian plane), i.e. direction following a front/back direction of the paper plane in FIG. 1. The tire 1 shown in FIG. 1 is an unloaded state. FIG. 2 is a cross-sectional view along the line II-II in FIG. 1. FIG. 3 is a partial perspective view of the tire 1 when viewing obliquely a portion shown in FIG. 2. FIG. 4 is a partial perspective view of the tire 1 when viewing the portion shown in FIG. 2 from a different direction than FIG. 3.

In FIGS. 1, 3 and 4, the arrow C indicates a tire circumferential direction. In FIGS. 1 to 4, the arrow X shows a tire-radial direction. In FIGS. 2, 3 and 4, the arrow Y shows the tire-width direction. The tire-width direction in FIG. 1 is the front/back direction of the paper plane. The symbol S1 in FIG. 2 is a tire equatorial plane. The tire-circumferential direction in FIG. 2 is the front/back direction of the paper plane.

The tire-circumferential direction is a direction around the tire rotational axis, which is the same direction as the direction in which the tire 1 rotates. The tire-radial direction is a direction perpendicular to the tire rotational axis. The tire-width direction is a direction parallel to the tire rational axis. In FIGS. 2, 3 and 4, one side in the tire-width direction is indicated as Y1, and the other side in the tire-width direction is indicated as Y2. The tire equatorial plane S1 shown in FIG. 2 is a plane orthogonal to the tire rotational axis, and is a plane positioned at the center of the tire-width direction.

The tire 1 of the embodiment includes: an inside annular part 20, an outside annular part 30, a plurality of spokes 40, and tread 50.

It should be noted that, hereinafter, the thicknesses of the inside annular part 20 and outside annular part 30 are dimensions in a direction along the tire-radial direction. The widths of the inside annular part 20 and outside annular part 30 are dimensions in a direction along the tire-width direction.

The inside annular part 20 is an annular portion along the tire-circumferential direction constituting the inner circumferential part of the tire 1. The thickness and width of the inside annular part 20 are set to be constant in order to improve the uniformity. A tire wheel (not shown) is arranged in the space on the inner circumferential side of the inside annular part 20. At the outer circumferential part of the rim of this tire wheel, the inner circumferential part of the inside annular part 20 fits and is mounted. The inside annular part 20 is mounted to the rim, and the tire 1 is mounted to the tire wheel. On the inner circumferential surface of the inside annular part 20, a fitting part configured by a convex part, groove or the like is provided for fitting with the rim of the tire wheel.

The inside annular part 20 can be formed by a resin material having elasticity, for example; however, the material is not limited to resin.

The inside annular part 20 transmits rotation of the above-mentioned tire wheel to the spokes 40 and outside annular part 30. The thickness of the inside annular part 20 is decided from the viewpoint of obtaining a weight reduction and durability, while satisfying the function of sufficiently transmitting rotational force to the spokes 40. The thickness of the inside annular part 20 is not particularly limited; however, a thickness of at least 2% and no more than 7% of the tire cross-sectional height, or at least 3% and no more than 6%, for example, can be exemplified. The inside diameter of the inside annular part 20 is a value depending on the diameter of the rim of the tire wheel to which the tire 1 is mounted, use of the vehicle, or the like. For example, in the case assuming a replacement for a general pneumatic tire, as the inside diameter of the inside annular part 20, for example, a dimension of 250 mm to 500 mm can be exemplified; however, it is not particularly limited. The width of the inside annular part 20 is a value depending on the application of the vehicle to which the tire 1 is mounted, axle length, etc. For example, in the case assuming a replacement for a general pneumatic tire, as the width of the inside annular part 20, a dimension of 100 mm to 300 mm can be exemplified; however, it is not particularly limited.

As shown in FIG. 2, a pair of inside sloped faces 21 approaching the outside annular part 30 from both ends in the tire-width direction toward the center in the tire-width direction is formed at the outer circumferential part of the inside annular part 20 facing the outside annular part 30. The inside sloped face 21 includes a first inside sloped face 211 on a side of the tire-width direction Y1 of the outer circumferential surface 20 a of the inside annular part 20 from the tire-width direction center; and a second inside sloped face 212 on a side of the tire-width direction Y2 of the outer circumferential surface 20 a from the center in the tire-width direction. The first inside sloped face 211 slopes to the inner side in the tire-radial direction (upwards in FIG. 2) as approaching an end on the side of the tire-width direction Y1 of the outer circumferential surface 20*a*. The second inside sloped face 212 slopes to the inner side in the tire-radial direction as approaching an end on the side of the tire-width direction Y2 of the outer circumferential surface 20*a*. In other words, the inside sloped face 21 has a feature of a mountain-shaped cross section sloping to the inner side in the tire-radial direction as approaching both sides in the tire-width direction from the tire-width direction center, and is configured to include the first inside sloped face 211 and second inside sloped face 212.

The inside sloped face 21 preferably slopes at an angle greater than 0° and less than 3° relative to the tire-width direction. In other words, the sloping angle θ1 of the first inside sloped face 211 is preferably greater than 0° and less than 3° relative to the tire-width direction. The sloping angle θ2 of the second inside sloped face 212 is also preferably greater than 0° and less than 3° relative to the tire-width direction.

The inside sloped face 21 preferably slopes at an angle greater than 0° and less than 2° relative to the tire-width direction. In other words, the sloping angle θ1 of the first inside sloped face 211 is preferably greater than 0° and less than 2° relative to the tire-width direction. The sloping angle θ2 of the second inside sloped face 212 is also preferably greater than 0° and less than 2° relative to the tire-width direction.

Each of the first inside sloped face 211 and second inside sloped face 212 extends to the end in the tire-width direction of the outer circumferential surface 20*a*. In other words, the inside sloped face 21 extends to both ends in the tire-width direction of the inside annular part 20. Each of the first inside sloped face 211 and second inside sloped face 212 is a flat surface along a direction intersecting the tire-radial direction and the tire-circumferential direction.

The outside annular part 30 is a ring-shaped portion along the tire-circumferential direction constituting the outer circumferential part of the tire 1. The outside annular part 30 is arranged coaxially with the inside annular part 20 at the outer circumferential side of the inside annular part 20. The thickness and width of the outside annular part 30 are set to be constant for improving the uniformity.

The outside annular part 30, for example, can be formed by a resin material having elasticity; however, the material is not limited to resin.

The outside annular part 30 transmits the rotation of the inner annular part 20 and spokes 40 to the road surface via the tread 50. The thickness of the outside annular part 30 is decided from the viewpoint of obtaining a weight reduction and durability, while satisfying the function of sufficiently transmitting the rotational force from the spokes 40 to the road surface. The thickness of the outside annular part 30 is not particularly limited; however, for example, a thickness of at least 2% and no more than 7% of the tire cross-sectional height, or at least 2% and no more than 5% can be exemplified. The inside diameter of the outside annular part 30 is a value depending on the dimension of the rim of the tire wheel to which the tire 1 is mounted, application of the vehicle, etc. For example, in the case assuming a replacement for a general pneumatic tire, as the inside diameter of the outside annular part 30, a dimension of 420 mm to 750 mm can be exemplified; however, it is not limited thereto. The width of the outside annular part 30 is the same as the width of the inside annular part 20.

As shown in FIG. 2, a pair of outside sloped faces 31 approaching the inside annular part 20 from both ends in the tire-width direction towards the tire-width direction center is formed at the inner circumferential part of the outside annular part 30 opposing the inside annular part 20. The outside sloped face 31 includes: a first outside sloped face 311 on a side of the tire-width direction Y1 of the inner circumferential surface 30*a* of the outside annular part 30 from the tire-width direction center; and a second outside sloped face 312 on a side of the tire-width direction Y2 of the inner circumferential surface 30*a* from the tire-width direction center. The first outside sloped face 311 is sloping to the outer side in the tire-radial direction (downwards in FIG. 2) towards an end on the side of the tire-width direction Y1 of the inner circumferential surface 30*a*. The second outside sloped face 312 is sloping to an outer side in the tire-radial direction as approaching the end on the side of the tire-width direction Y2 of the inner circumferential surface 30*a*. In other words, the outside sloped face 31 has a feature of a mountain-shaped cross section sloping to the outer side in the tire-radial direction as approaching both sides in the tire-width direction from the center in the tire-width direction, and is configured to include the first outside sloped face 311 and second outside sloped face 312.

The outside sloped surface 31 preferably slopes at an angle greater than 0° and less than 3° relative to the tire-width direction. In other words, the sloping angle θ3 of the first inside sloped face 311 is preferably greater than 0° and less than 3° relative to the tire-width direction. The sloping angle θ4 of the second inside sloped face 312 is preferably greater than 0° and less than 3° relative to the tire-width direction.

The outside sloped face 31 preferably slopes at an angle greater than 0° and less than 2° relative to the tire-width direction. In other words, the sloping angle θ3 of the first outside sloped face 311 is preferably greater than 0° and less than 2° relative to the tire-width direction. The sloping angle θ4 of the second outside sloped face 312 is preferably greater than 0° and less than 2° relative to the tire-width direction.

Each of the first outside sloped face 311 and second outside sloped face 312 extends to the end in the tire-width direction of the outer circumferential surface 30*a*. In other words, the outside sloped face 31 extends to both ends in the tire-width direction of the outside annular part 30. Each of the first outside sloped face 311 and second outside sloped face 312 is a flat surface along a direction intersecting the tire-radial direction and the tire-circumferential direction.

A plurality of the spokes 40 connect the inside annular part 20 and outside annular part 30. The inside annular part 20 and outside annular part 30 connected by the plurality of spokes 40 are arranged coaxially with each other. Each of the plurality of spokes 40 is arranged independently along the tire circumferential direction. As shown in FIG. 1, the plurality of spokes 40 extends substantially parallel to the tire-radial direction when viewed from a side, in the unloaded state of the tire 1. The plurality of spokes 40 are arranged at equal intervals in the tire-circumferential direction.

As shown in FIGS. 2 to 4, the plurality of spokes 40 in the embodiment includes a plurality of first spokes 41 and a plurality of second spokes 42. For all of the first spokes 41 and second spokes 42, the extending direction thereof is not parallel to the tire-radial direction when viewing in a direction along the tire-circumferential direction. The first spokes 41 slope to one side in the tire-width direction. The second spokes 42 slope to the opposite side than the first spoke 41. The first spokes 41 and second spokes 42 are arranged alternately in the tire-circumferential direction.

As shown in FIGS. 2 to 4, the first spokes 41 all extend from the Y1 side, which is one side in the tire-width direction of the outside annular part 30, to slope towards the Y2 side, which is the other side of the tire-width direction of the inside annular part 20. The second spokes 42 all extend from the Y2 side, which is the other side in the tire-width direction of the outside annular part 30, to slope towards the Y1 side, which is one side in the tire-width direction of the inside annular part 20.

The sloping angles of the first spokes 41 and second spokes 42 are the same. For this reason, the first spokes 41 and second spokes 42 adjacent in the tire-circumferential direction are arranged in a substantially X shape when viewing from a direction along the tire-circumferential direction. As shown in FIG. 2, the first spokes 41 slope at an angle θ relative to the tire-width direction, and this angle θ is preferably at least 30° and no more than 60°, for example. The second spoke 42 also slopes at the same angle θ to the opposite side.

As shown in FIG. 2, each of the first spokes 41 and second spokes 42 are the same shape symmetrical to the tire equatorial plane S1, in a state viewing from a direction along the tire-circumferential direction. Therefore, in the following, when it is not necessary to differentiate between the first spokes 41 and second spokes 42, and they can be explained collectively, the first spoke 41 and second spoke 42 are generically called spoke 40.

The spoke 40 is formed in a plate shape extending in-plane of the tire-radial direction and the tire-width direction. The spoke 40 extends obliquely at the angle of angle θ in the above way, from the inside annular part 20 towards the outside annular part 30. As shown in FIG. 3, the thickness direction of plate thickness t of the spoke 40 follows the tire-circumferential direction. As shown in FIGS. 2 and 3, the plate width w of the spoke 40 is the width of the first intermediate part 410 and second intermediate part 420 described later, and is a dimension in a direction orthogonal to the sloping direction in which the spoke 40 extends, when viewing the spoke 40 from a direction following the tire-circumferential direction. In the embodiment, the plate thickness t of all spokes 40 is the same. In addition, the plate width w of all spokes 40 is the same.

Since the spoke 40 is an elongated plate shape, even if thinning the plate thickness t, it is possible to improve the durability of the spokes 40 by setting the plate width w to be wide. Furthermore, by increasing the number of spokes 40 by thinning the plate thickness t, it is possible to decrease the intervals between spokes 40 adjacent in the tire-circumferential direction, while maintaining the rigidity of the tire 1 overall. The ground pressure during tire rolling distributes by the spokes 40, and can thereby reduce the ground pressure.

It should be noted that the spokes 40 of the embodiment are parallel to the tire-radial direction in a side view; however, the spokes 40 may be a state extending obliquely relative to the tire-radial direction so as to intersect the tire-radial direction in a side view.

The first spoke 41 includes a first intermediate part 410 as an intermediate part extending between the inside annular part 20 and outside annular part 30; a first inside connection part 411 as the inside connection part connecting the first intermediate part 410 and inside annular part 20; and a first outside connection part 412 as the outside connection part connecting the first intermediate part 410 and outside annular part 30.

The first intermediate part 410 is a portion having a plate width w of the spoke 40, and is a portion matching in the sloping direction of the first spoke 41. The first intermediate part 410 is positioned in the middle of the tire-radial direction between the inside annular part 20 and outside annular part 30. The first intermediate part 410 refers to a region in the tire-radial direction having a portion in which both sides facing the tire-width direction are straight.

The first inside connection part 411 is provided in half the region on the Y2 side in the tire-width direction of the inside annular part 20. The first inside connection part 411 has a first inside transition part 411*b* arranged at an inner side in the tire-width direction, and which continuously transitions from the first intermediate part 410 to the inside annular part 20; and a second inside transition part 411*a* arranged at an outer side in the tire-width direction and which continuously transitions from the first intermediate part 410 to the inside annular part 20. The first inside transition part 411*b* is arranged at a side at which the angle formed by the first intermediate part 410 and inside annular part 20 makes an acute angle. The second inside transition part 411*a* is arranged at a side at which the angle formed by the first intermediate part 410 and inside annular part 20 makes an obtuse angle.

The first inside transition part 411 b is arranged at an inner side in the tire-width direction (side of tire equatorial plane S1). The first inside transition part 411*b* is formed in a recessed arc shape from the first intermediate part 410 until a position of the tire equatorial plane S1 of the inside annular part 20, and links to the first inside sloped face 211. In other words, the first inside connection part 411 includes the first inside transition part 411*b* having a shape continuously linking from the first intermediate part 410 to the first inside sloped face 211. The first inside transition part 411*b* is provided at a side of the first inside connection part 411 at which the angle formed by the first intermediate part 410 and inside annular part 20 makes an acute angle. The first inside transition part 411*b* of the embodiment is an example of the inside continuous part according to the present disclosure continuously linking to the first inside sloped face 211.

It should be noted that the first inside transition part 411*b* of the embodiment is formed so as to link to the first inside sloped face 211 at a position of the tire equatorial plane S1; however, it may be formed so as to link to the second inside sloped face 212 at a position closer to the first inside connection part 411 than the tire equatorial plane S1, or link to the first inside sloped face 211 past the tire equatorial plane S1.

The second inside transition part 411*a* is arranged at the outer side in the tire-width direction. The second inside transition part 411*a* extends while gently bending to the end on the Y2 side in the tire-width direction of the inside annular part 20.

The first inside connection part 411 has a shape which widens along the tire-width direction as approaching the inside annular part 20, by the first inside transition part 411*b* and second inside transition part 411*a*

The first outside connection part 412 is provided to half the region on the tire-width direction Y1 side of the outside annular part 30. The first outside connection part 412 includes a first outside transition part 412*b* arranged at the inner side of the tire-width direction and which continuously transitions from the first intermediate part 410 to the outside annular part 30; and a second outside transition part 412*a* arranged at the outer side of the tire-width direction and which continuously transitions from the first intermediate part 410 to the outside annular part 30. The first outside transition part 412*b* is arranged at a side at which the angle formed by the first intermediate part 410 and outside annular part 30 makes an acute angle. The second outside transition part 412*a* is arranged at a side at which the angle formed by the first intermediate part 410 and outside annular part 30 makes an obtuse angle.

The first outside transition part 412*b* is arranged at the inner side in the tire-width direction (side of tire equatorial plane S1). The first outside transition part 412*b* is formed in a recessed arc shape from the first intermediate part 410 to a position of the tire equatorial plane S1 of the outside annular part 30, and links to the second outside sloped face 312. In other words, the first outside connection part 412 includes a first outside transition part 412*b* having a shape that continuously links from the first intermediate part 410 to the second outside sloped face 312. The first outside transition part 412*b* is arranged at a side of the first outside connection part 412 at which the angle formed by the first intermediate part 410 and outside annular part 30 makes an acute angle. The first outside transition part 412*b* of the embodiment is an example of an outside continuous part according to the present disclosure continuously linking to the second outside sloped face 312.

It should be noted that the first outside transition part 412*b* of the embodiment is formed so as to link to the second outside sloped face 312 at the position of the tire equatorial plane S1; however, it may be formed so as to link to the first outside sloped face 311 at a position closer to the first outside connection part 412 than the tire equatorial plane S1, or to link to the second outside sloped face 312 past the tire equatorial plane S1.

The second outside transition part 412*a* is arranged at the outer side in the tire-width direction. The second outside transition part 412*a* extends while gently bending until the end on the Y1 side in the tire-width direction of the outside annular part 30.

By the first outside transition part 412*b* and second outside transition part 412*a*, the first outside connection part 412 has a shape widening along the tire-width direction as approaching the outside annular part 30.

The second spoke 42 is the same shape as the first spoke 41, and is a symmetrical shape with the first spoke 41 relative to the tire equatorial plane S1.

As shown in FIGS. 2 and 3, the second spoke 42 includes a second intermediate part 420 as an intermediate part extending between the inside annular part 20 and outside annular part 30; a second inside connection part 421 as an inside connection part connecting the second intermediate part 420 and inside annular part 20; and a second outside connection part 422 as an outside connection part connecting the second intermediate part 420 and outside annular part 30.

The second intermediate part 420 is a portion having a plate width w of the spoke 40, and is a portion matching in the sloping direction of the second spoke 42. The second intermediate part 420 is positioned at the middle in the tire-radial direction between the inside annular part 20 and outside annular part 30. The second intermediate part 420 refers to a region in the tire-radial direction having a portion in which both sides facing the tire-width direction are straight.

The second inside connection part 421 is provided in half of the region on the Y1 side in the tire-width direction of the inside annular part 20. The second inside connection part 421 has a first inside transition part 421*b* arranged at the inner side of the tire-width direction and which continuously transitions from the second intermediate part 420 to the inside annular part 20; and a second inside transition part 421*a* arranged at the outer side in the tire-width direction and which continuously transitions from the second intermediate part 420 to the inside annular part 20. The first inside transition part 421 is arranged at a side at which the angle formed by the second intermediate part 420 and inside annular part 20 makes an acute angle. The second inside transition part 421*a* is arranged at a side at which the angle formed by the second intermediate part 420 and inside annular part 20 makes an obtuse angle.

The first inside transition part 421*b* is arranged at an inner side in the tire-width direction (side of tire equatorial plane S1). The first inside transition part 421*b* is formed in a recessed arc shape from the second intermediate part 420 to a position of the tire equatorial plane S1 of the inside annular part 20, and links to the second inside sloped face 212. In other words, the second inside connection part 421 includes the first inside transition part 421*b* having a shape continuously linking from the second intermediate part 420 to the second inside sloped face 212. The first inside transition part 421*b* is provided to a side of the second inside connection part 421 at which the angle formed by the second intermediate part 420 and inside annular part 20 makes an acute angle. The first inside transition part 421*b* of the embodiment is an example of the inside continuous part according to the present disclosure continuously linking to the second inside sloped face 212.

It should be noted that the first inside transition part 421*b* of the embodiment is formed so as to link to the second inside sloped face 212 at a position of the tire equatorial plane S1; however, it may be formed so as to link to the first inside sloped face 211 at a position closer to the second inside connection part 421 than the tire equatorial plane S1, or link to the second inside sloped face 212 past the tire equatorial plane S1.

The second inside transition part 421*a* is arranged at the outer side in the tire-width direction. The second inside transition part 421*a* extends while gently bending to the end on the Y1 side in the tire-width direction of the inside annular part 20.

By way of the first inside transition part 421*b* and second inside transition part 421*a*, the second inside connection part 421 has a shape widening along the tire-width direction as approaching the inside annular part 20.

The second outside connection part 422 is provided in half of the region on the Y2 side in the tire-width direction of the outside annular part 30. The second outside connection part 422 includes: a first outside transition part 422*b* arranged at an inner side in the tire-width direction and which continuously transitions from the second intermediate part 420 to the outside annular part 30; and a second outside transition part 422*a* arranged at the outer side in the tire-width direction and which continuously transitions from the second intermediate part 420 to the outside annular part 30. The first outside transition part 422*b* is arranged at a side at which the angle formed by the second intermediate part 420 and outside annular part 30 makes an acute angle. The second outside transition part 422*a* is arranged at a side at which the angle formed by the second intermediate part 420 and outside annular part 30 makes an obtuse angle.

The first outside transition part 422*b* is arranged at the inner side in the tire-width direction (side of tire equatorial plane S1). The first outside transition part 422*b* is formed in a recessed arc shape from the second intermediate part 420 to a position of the tire equatorial plane S1 of the outside annular part 30, and links to the first outside sloped face 311. In other words, the second outside connection part 422 includes a first outside transition part 422*b* having a shape continuously linking from the second intermediate part 420 to the first outside sloped face 311. The first outside transition part 422*b* is provided at a side of the second outside connection part 422 at which the angle formed by the second intermediate part 420 and outside annular part 30 makes an acute angle. The first outside transition part 422*b* of the embodiment is an example of an outside connection part according to the present disclosure continuously linking to the first outside sloped face 311.

It should be noted that the first outside transition part 422*b* of the embodiment is formed so as to link to the first outside sloped face 311 at a position of the tire equatorial plane S1; however, it may be formed so as to link to the second outside sloped face 312 at a position closer to the second outside connection part 422 than the tire equatorial plane S1, or link to the first outside sloped face 311 past the tire equatorial plane S1.

The second outside transition part 422*a* is arranged at the outer side in the tire-width direction. The second outside transition part 422*a* extends while gently bending to an end on the Y2 side in the tire-width direction of the outside annular part 30.

By way of the first outside transition part 422*b* and second outside transition part 422*a*, the second outside connection part 422 has a shape widening along the tire-width direction as approaching the outside annular part 30.

As mentioned above, the plate thickness t of all spokes 40 of the embodiment are the same. The plate thickness t of the spoke 40 is not particularly limited; however, since the spokes 40 receive sufficient rotational force from the inside annular part 20 and outside annular part 30, while being configured to be able to flex and deform appropriately upon receiving load, it is preferably at least 1 mm and no more than 30 mm, and more preferably at least 5 mm and no more than 25 mm.

As mentioned above, the plate width w of all spokes 40 of the embodiment are the same. The plate width w of the spoke 40 is the width of the first intermediate part 410 and the second intermediate part 420. The plate width w of the spoke 40 is not particularly limited; however, since configured so as to be able to flex and deform appropriately upon receiving load, while sufficiently receiving rotational force from the inside annular part 20 and outside annular part 30, it is preferably at least 5 mm and no more than 25 mm, and more preferably at least 10 mm and no more than 20 mm. In addition, the plate width w is preferably at least 110% of the plate thickness t, and more preferably at least 115%, from the viewpoint of being able to distribute the contact pressure while improving durability.

As the number of spokes 40, from the viewpoint of weight reduction being possible while sufficiently supporting the load from the vehicle, and enabling to achieve both power transmission and a durability improvement, it is preferably at least 80 and no more than 300, and more preferably at least 100 and no more than 200 spokes.

The interval in the tire-circumferential direction of the plurality of the spokes 40, for example, is preferably set to at least 1.0 mm and no more than 4.1 mm. It should be noted that, in the embodiment, the interval in the tire-circumferential direction of the plurality of spokes 40 is equal; however, it may be unequal spacing.

As the dimension in the tire-radial direction of the spoke 40, a dimension of at least 45 mm and no more than 75 mm can be exemplified, but is not limited thereto.

The spoke 40 can be formed by an elastic material listed below. First, as characteristics of this elastic material, from the viewpoint of providing appropriate rigidity while maintaining sufficient durability, a tensile test is performed based on JIS K 7312, and the tensile module calculated from the tensile stress at 10% elongation is preferably at least 3 MPa and no more than 12 MPa.

In the spokes 40, in the case of the tensile modulus calculated from the tensile stress at 10% elongation falling below 3 MPa, sufficient rigidity will not be obtained, and there is a possibility of spokes 40 adjacent in the tire-circumferential direction containing. On the other hand, in the case of the tensile modulus calculated from the tensile stress at 10% elongation exceeding 12 MPa, the rigidity becomes excessively high, and riding comfort worsens.

As the elastic material which can be used as the base material of the spoke 40, a thermoplastic elastomer, crosslinked rubber and other resins can be exemplified.

As the thermoplastic elastomer, polyester elastomer, polyolefin elastomer, polyamide elastomer, polystyrene elastomer, polyvinyl chloride elastomer, polyurethane elastomer and the like are exemplified.

As the rubber material constituting the crosslinked rubber, it is possible to use any of natural rubbers and synthetic rubbers. As synthetic rubbers, styrene butadiene rubber (SBR), butadiene rubber (BR), isoprene rubber (IIR), nitrile rubber (NBR), hydrogenated nitrile rubber (hydrogenated NBR), chloroprene rubber (CR), ethylene propylene rubber (EPDM), fluororubber, silicone rubber, acrylic rubber, urethane rubber and the like are exemplified. These rubber materials may be jointly used as two or more types as necessary.

As the other resins, thermoplastic resin and thermosetting resin can be exemplified. As the thermoplastic resin, polyethylene resin, polystyrene resin, polyvinyl chloride resin and the like can be exemplified. As the thermosetting resin, epoxy resin, phenolic resin, polyurethane resin, silicone resin, polyimide resin, melamine resin and the like can be exemplified.

In the spokes 40, among the above-mentioned elastic materials, a polyurethane resin can be preferably used from the viewpoint of molding, workability and cost. It should be noted that, as the elastic material, it is also possible to use foam materials. In other words, it is possible to use a material made by foaming the above-mentioned thermoplastic elastomers, crosslinked rubber, and other resins.

It should be noted that the elastic material that can be used as the base material of the spokes 40 may be reinforced by reinforced fiber. As the reinforced fiber, long fibers, short fibers, woven fabrics, non-woven fabrics and the like can be exemplified. As the types of reinforced fibers, polyamide cords such as rayon cord and nylon-6, 6, polyester cords such as polyethylene terephthalate, aramid cord, glass fiber cord, carbon fiber, steel cord and the like can be exemplified.

It should be noted that reinforcement of the elastic material is not limited to reinforcement by reinforced fibers. For example, reinforcement may be performed by the addition of granular filler. As the granular filler added, carbon black, ceramics such as silica and alumina, and fillers of other inorganic materials can be exemplified.

However, the aforementioned inside annular part 20 and outside annular part 30 are preferably formed of the same resin material as the spokes 40, and in this case, it is possible to integrally mold the inside annular part 20, outside annular part 30 and spokes 40 by a cast molding method, for example.

The tread 50 is provided to the outer circumferential surface of the outside annular part 30. The tread 50 constitutes the outermost circumferential portion of the tire 1. The tread 50 includes tread rubber 51. The tread rubber 51 has a tread surface 51 a making ground contact with the road surface at the outer circumferential surface. As the rubber material of the tread rubber 51, there is no particular limitation to the type thereof, and it is possible to use a common vulcanized rubber or the like as the rubber constituting the tread for a vehicle tire. At the tread surface 51 a of the tread rubber 51, the tread pattern formed by a plurality of grooves and land blocks are provided similarly to a conventional pneumatic tire. It should be noted that the tread rubber 51 may be a configuration in which a plurality of rubber layers of different composition and properties are laminated (for example, two layers or three layers). In addition, the tread 50 may be formed with resin.

It should be noted that the tire 1 of the embodiment may further be provided with a reinforcement layer for improving the rigidity and traction of the tire 1 over the entire tire circumference. The reinforcement layer is provided over the entire tire circumference, for example, and may be embedded inside of the outside annular part 30, and may be provided between the outside annular part 30 and tread 50.

According to the tire 1 of the embodiment, the following effects are exerted.

(1) The tire 1 according to the embodiment is a non-pneumatic tire including: an inside annular part 20; an outside annular part 30 disposed coaxially at an outer circumferential side of the inside annular part 20; a plurality of spokes 40 connecting the inside annular part 20 and the outside annular part 30, and arranged along a tire-circumferential direction; and tread 50 provided at an outer circumferential surface of the outside annular part 30, in which a pair of inside sloped faces 21 approaching the outside annular part 30 from both ends in a tire-width direction towards the tire-width direction center is formed at an outer circumferential part of the inside annular part 20 opposing the outside annular part 30, a pair of outside sloped faces 31 approaching the inside annular part 20 from both ends in the tire-width direction towards the tire-width direction center is formed at an inner circumferential part of the outside annular part 30 opposing the inside annular part 20, the spoke 40 has an intermediate part (first intermediate part 410, second intermediate part 420) extending between the inside annular part 20 and the outside annular part 30, an inside connection part (first inside connection part 411, second inside connection part 421) that connects the intermediate part and the inside annular part 20, and an outside connection part (first outside connection part 412, second outside connection part 422) connecting the intermediate part and the outside annular part 30, the inside connection part includes an inside continuous part (first inside transition parts 411*b*, 421*b*) having a shape continuously linking to the inside sloped face 21, and the outside connection part includes an outside continuous part (first outside transition parts 412*b*, 422*b*) having a shape continuous to the outside sloped face 31.

In the spokes 40 of the embodiment, the inside connection part connecting to the inside annular part 20 has an inside continuous part which continuously links to the inside sloped face 21 of the inside annular part 20, and the outside connection part connecting to the outside annular part 30 has an outside continuous part that continuously links to the outside sloped face 31 of the outside annular part 30. Stress concentration at the root portions of the spoke 40 relative to the inside annular part 20 and outside annular part 30 is suppressed by the inside continuous part and outside continuous part, and as a result thereof, rigidity of the spokes 40 improves, and durability improves. By deformation of the spokes 40 being suppressed accompanying a rigidity improvement of the spokes 40, the interval between the spokes 40 is maintained, and contact of spokes 40 adjacent in the tire-circumferential direction is suppressed. The spokes 40 are thereby hardly damaged. As a result of these, a durability improvement of the tire 1 overall is achieved. Furthermore, by the deformation suppressing effect of the spokes 40 accompanying the rigidity improvement of the spokes 40, the rolling resistance decreases.

By the inside annular part 20 having the inside sloped face 21, the rigidity of the inside annular part 20 improves, and the fitting property of the inside annular part 20 with the rim thereby improves. By the outside annular part 30 having the outside sloped face 31, the rigidity of the outside annular part 30 improves, and buckling thereby hardly occurs, and flat spots are suppressed from occurring in the tread 50 accompanying this.

By having the inside sloped face 21 and outside sloped face 31, upon mold forming the tire 1, the inside sloped face 21 and outside sloped face 31 serve as drafts whereby it becomes possible to facilitate release from the mold.

(2) In the tire 1 according to the present embodiment, the inside sloped face 21 and outside sloped face 31 are sloping at an angle greater than 0° and less than 3° relative to a tire-width direction.

Although ride comfort tends to decline when raising the rigidity of the tire 1, since the sloping angles of the inside sloped face 21 and outside sloped face 31 relative to the tire-width direction are less than 3°, it is thereby possible to maintain favorable ride comfort.

(3) In the tire 1 according to the present embodiment, the inside sloped face 21 and outside sloped face 31 are sloping at an angle no greater than 2° relative to a tire-width direction.

It thereby becomes possible to improve the rigidity of the tire 1 overall, while maintaining favorable traction and wear resistance.

(4) In the tire 1 according to the present embodiment, the intermediate part of the spoke 40 extends to slope relative to a tire-radial direction when viewing from a tire-circumferential direction, the inside continuous part is provided at a side of the inside connection part at which an angle formed by the intermediate part and the inside annular part 20 makes an acute angle, and the outside continuous part is provided at a side of the outside connection part at which an angle formed by the intermediate part and the outside annular part 30 makes an acute angle.

In the case of the intermediate part of the spoke 40 sloping, a great stress acts on the side of the inside contact part and outside contact part at which the angle formed by each annular part 20, 30 makes an acute angle. Herein, since the inside continuous part and outside continuous part which are continuous with each sloped face are provided to these portions in the embodiment, stress is less concentrated, and an improvement in rigidity is achieved.

(5) In the tire 1 according to the present embodiment, the inside sloped face 21 extends to both ends in the tire-width direction of the inside annular part 20, and the outside sloped face 31 extends to both ends in the tire-width direction of the outside annular part 30.

The improvement effect in rigidity of the tire 1 overall accompanying the rigidity improvement by the inside sloped face 21 and outside sloped face 31 thereby increases.

(6) In the tire 1 according to the present embodiment, each of the inside sloped face 21 and the outside sloped face 31 are flat.

The stress acting on the inside sloped face 21 and outside sloped face 31 tends to disperse, and tends to obtain the effect of a rigidity improvement.

(7) In the tire 1 according to the present embodiment, the spokes 40 include: a first spoke 41 at which the intermediate part slopes to one side in the tire-axial direction, and a second spoke 42 at which the intermediate part slopes to the opposite side than the first spoke 41, in which the first spoke 41 and the second spoke 42 are alternately disposed in the tire-circumferential direction.

The first spoke 41 and second spoke 42 are thereby arranged in a substantially X shape when viewed from a direction along the tire-circumferential direction. The first spoke 41 and second spoke 42 suppress the rigidity from becoming excessively high due to each being sloped in the tire-axial direction, and thus a ride comfort improvement is achieved.

EXAMPLES

Using an analytical model of tires of the Examples from FEM including the configuration similar to the above embodiment, the weight of the tire, rigidity, von Mises stress, inter-spoke distance, contact area and maximum contact pressure when applying a load of 200 kg were calculated. As Example 1, a tire was used in which the sloping angle of the inside sloped face 21 and outside sloped face 31 relative to the tire-width direction is 2°. As Example 2, a tire was used in which the sloping angle of the inside sloped face 21 and outside sloped face 31 relative to the tire-width direction is 3°. Used as comparative examples were Comparative Example 1 having a size and configuration similar to Example 1 and Example 2, but not having the sloped face at each of the inside annular part 20 and outside annular part 30 (inside sloped face and outside sloped face), Comparative Examples 2 and 3 having a sloped face only at the inside annular part 20 (inside sloped face), and Comparative Example 4 having a sloped face only at the outside annular part 30 (outside sloped face). The sloping angle of the inside sloped face 21 relative to the tire-width direction of Comparative Example 2 is 2°, and sloping angle of the inside sloped face 21 relative to the tire-width direction of Comparative Example 3 is 5°. In addition, the sloping angle of the outside sloped face 31 relative to the tire-width direction of Comparative Example 4 is 2°. Also for Comparative Examples 1 to 4, the analytical model of these tires was used to calculate the same items as Examples 1 and 2.

Figure 5A:
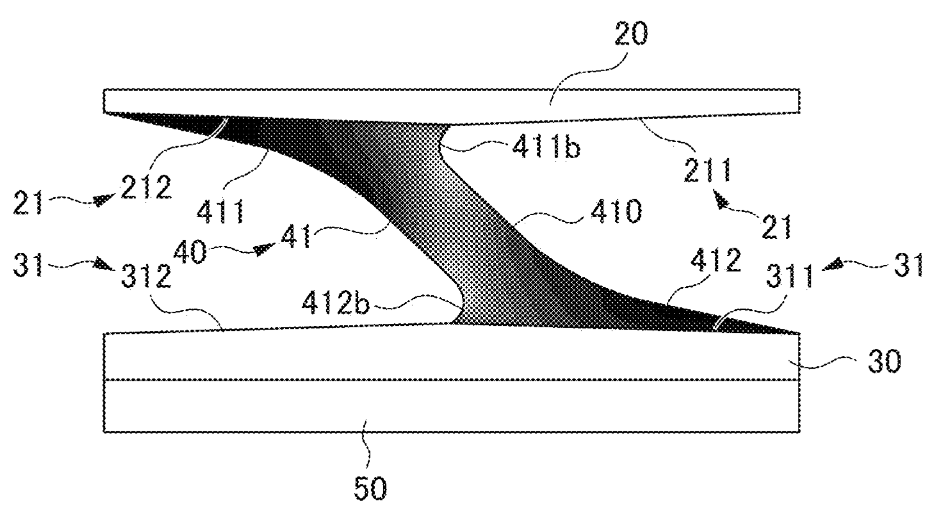
FIG. 5A is a contour diagram showing a distribution of von Mises stress of a first spoke in an analytical model of Example 1.
Figure 5B:
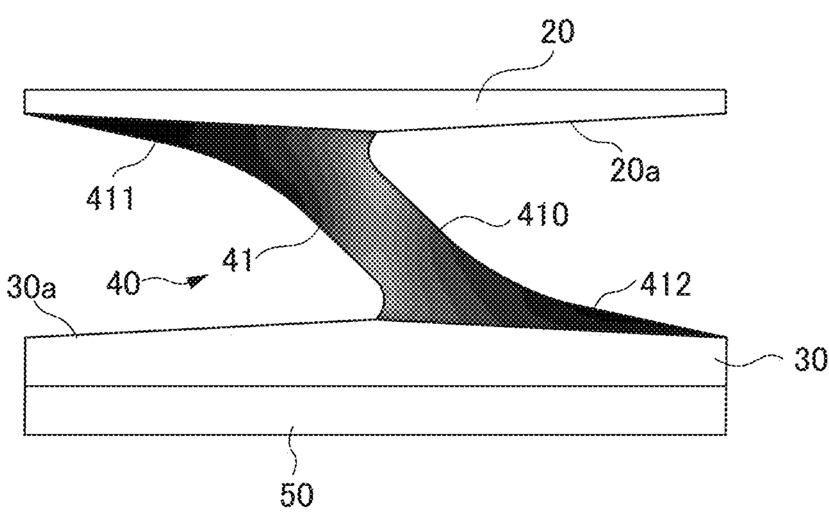
FIG. 5B is a contour diagram showing a distribution of von Mises stress of a first spoke in an analytic model of Example 2.
Figure 5C:
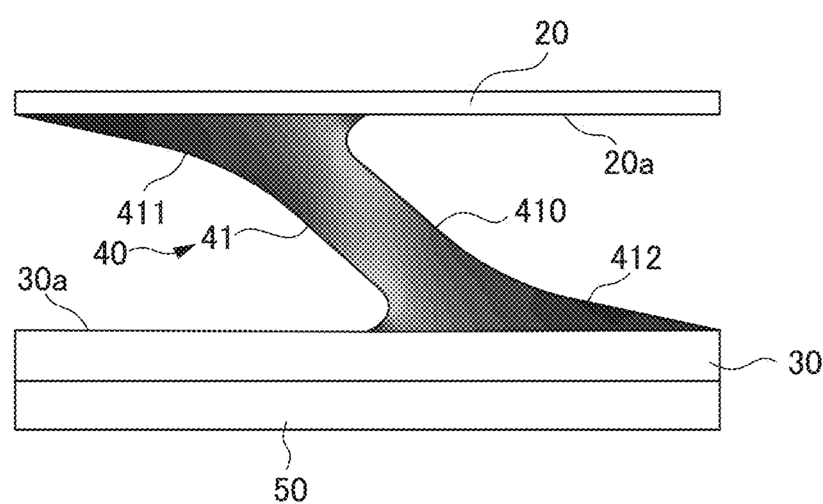
FIG. 5C is a contour diagram showing a distribution of von Mises stress of a first spoke in an analytical model of Comparative Example 1.
Figure 5D:
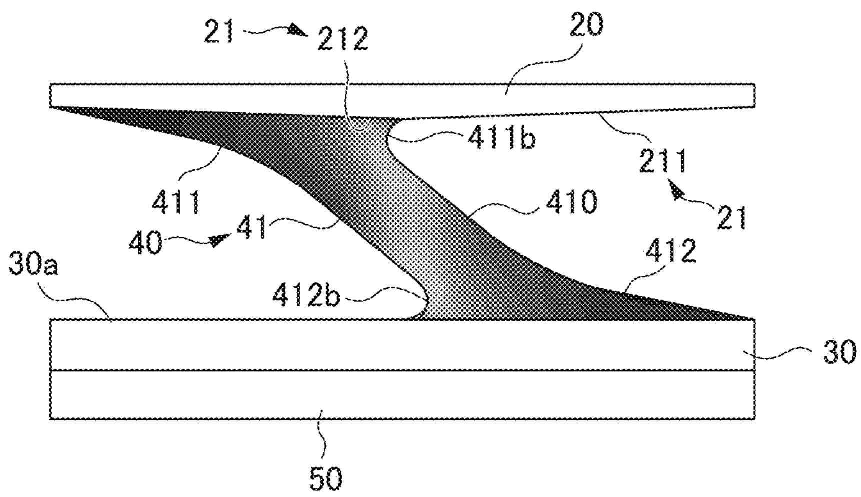
FIG. 5D is a contour diagram showing a distribution of von Mises stress of a first spoke in an analytical model of Comparative Example 2.
Figure 5E:
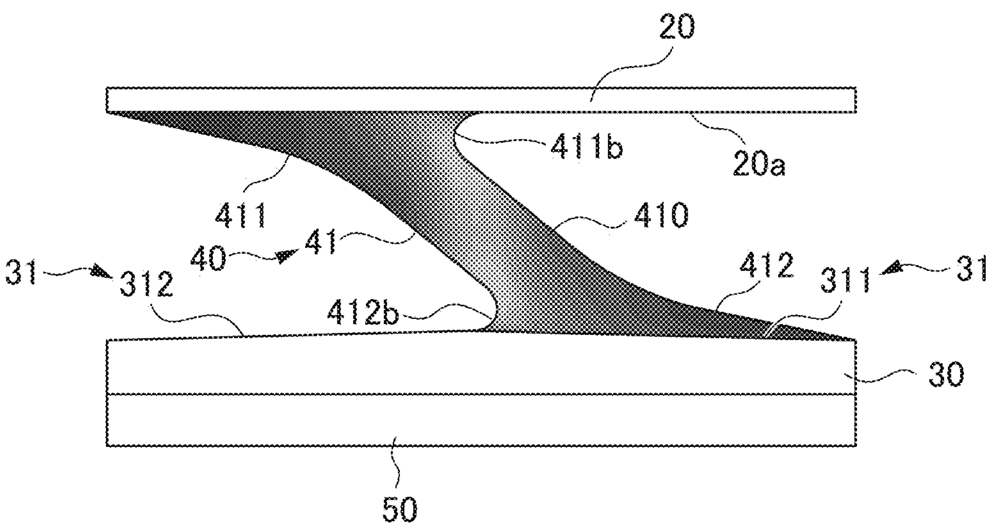
FIG. 5E is a contour diagram showing a distribution of von Mises stress of a first spoke in an analytical model of Comparative Example 4.
Figure 5F:
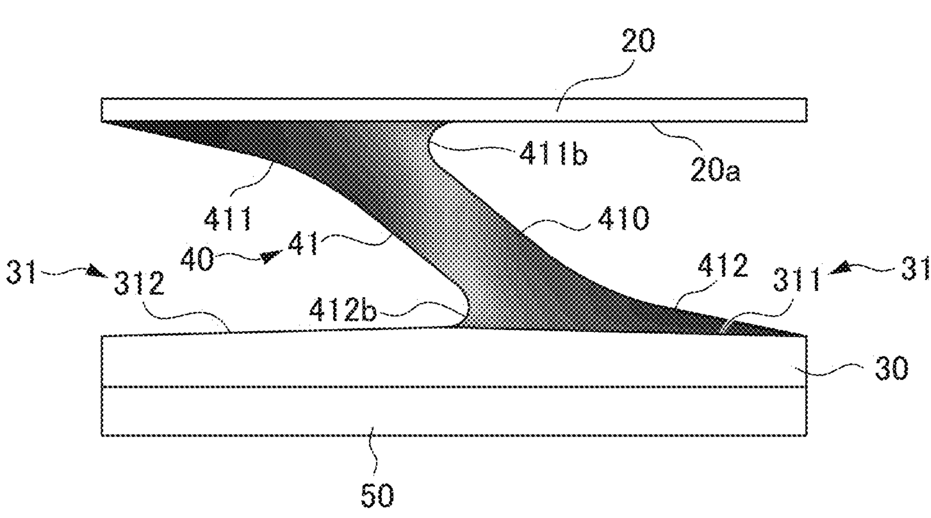

FIG. 5A is a contour diagram representing the distribution of von Mises stress of a first spoke 41 in the analytical model of Example 1 by black shading. FIG. 5B is a contour diagram representing the distribution of von Mises stress of a first spoke 41 in the analytical model of Example 2 by black shading. FIG. 5C a contour diagram representing the distribution of von Mises stress of a first spoke 41 in the analytical model of Comparative Example 1 by black shading. FIG. 5D a contour diagram representing the distribution of von Mises stress of a first spoke 41 in the analytical model of Comparative Example 2 by black shading. FIG. 5E a contour diagram representing the distribution of von Mises stress of a first spoke 41 in the analytical model of Comparative Example 4 by black shading. In all cases, a state of greater stress occurring is indicated with lighter black shading. When comparing Examples 1, 2 and Comparative Examples 1, 2 and 4, Comparative Example 1 in FIG. 5C, Comparative Example 2 in FIG. 5D and Comparative Example 4 in FIG. 5E had a wider range in which stress acted than Example 1 in FIG. 5A and Example 2 in FIG. 5B, and this stress was greater The stress acting on the side of the inside annular part 20 in Comparative Example 2 is small compared to Comparative Example 1, and the stress acting on the side of the outside annular part 30 in Comparative Example 4 is small compared to Comparative Example 1; however, the stress acting on the first spokes 41 overall in Example 1 and Example 2 is small compared to Comparative Example 1. Therefore, it is found that the stress occurring when a load is applied dispersed more and the rigidity improves when having the inside sloped face 21 and outside sloped face 31 in each of the inside annular part 20 and outside annular part 30. In addition, when comparing Example 1 and Example 2 with Comparative Example 1, it is found that the stress occurring when load acts on the first spokes 41 becomes smaller in the order of Comparative Example 1, Example 1 and Example 2. In other words, it is preferable to have the sloped face in both the inside annular part 20 and outside annular part 30, and it is found that there is a trend for the stress generating when a load is applied becoming smaller for a greater sloping angle of the inside sloped face 21 and outside sloped face 31 relative to the tire-width direction.

TABLE 1

| | Comparative Example 1 | Comparative Example 2 | Comparative Example 3 | Comparative Example 4 | Example 1 | Example 2 |
|---|---|---|---|---|---|---|
| Sloping angle | 0 | 2° (inside) | 5° (inside) | 2° (outside) | 2° (inside and outside) | 3° (inside and outside) |
| Weight [kgf] | 100 | 102 | 105 | 102 | 104 | 107 |
| Rigidity [N/mm] | 100 | 106 | 115 | 107 | 116 | 124 |
| Von Mises stress [N/mm$^2$] | 100 | 100 | 99 | 99 | 98 | 83 |
| Inter-spoke distance [mm] | 100 | 103 | 107 | 103 | 106 | 109 |
| Contact area [mm$^2$] | 100 | 100 | 99 | 99 | 99 | 98 |
| Maximum contact pressure [kgf/mm$^2$] | 100 | 102 | 103 | 104 | 106 | 108 |
| Spoke durability | — | ○ | ○ | ○ | ◎ | ◎ |
| Rolling resistance | — | ○ | ◎ | ○ | ◎ | ○ |
| Traction | — | Equal | ○ | ○ | ○ | Δ |
| Fitting property with rim | — | ○ | ○ | Equal | ○ | ○ |
| Buckling and flat spotting suppression | — | Equal | Equal | ○ | ○ | ○ |
| Ride comfort | — | ○ | Δ | ○ | ○ | Δ |
| Processability | — | ○ | Δ | ○ | ◎ | ○ |

Table 1 shows the measured values for weight, rigidity von Mises stress occurred at the first spoke 41, inter-spoke distance, contact area, and maximum ground pressure of Example 1, Example 2 and Comparative Examples 1 to 4, and the evaluation results of the spoke durability, rolling resistance, traction and fitting property with the rim of the tire wheel, buckling and flat spotting suppression, ride comfort, and processibility indicating the ease of processing of the tire, based on the results of each measured value. The measured values shown in Table 1 are values from index evaluating Example 1, Example 2 and Comparative Examples 1 to 4 relative to Comparative Example 1, with the measured values for Comparative Example 1 as index number 100. Evaluation results for spoke durability, rolling resistance, traction, fitting property with the rim, buckling and flat spot resistance, ride comfort and processability, in the case of exceeding Comparative Example 1 and being particularly favorable are defined as "◎", in the case of being favorable are defined as "○", in the case of being equal to Comparative Example 1 are defined as "equal", and in the case of slightly below Comparative Example 1 are defined as "Δ".

FIGS. 6A to 6F are graphs shown by plotting the weight, rigidity, the von Mises stress occurring at the first inside transition part 411*b* of the first spoke 41, inter-spoke distance, contact area and maximum contact pressure of Example 1, Example 2 and Comparative Examples 1 to 4 shown in Table 1. In these graphs, the values of index evaluating Example 1, Example 2 and Comparative Examples 2 to 4 relative to Comparative Example 1 with the measured values of Comparative Example 1 as index number 100 are shown on the vertical axis, and the angles are shown on the horizontal axis. It should be noted that, in each graph, the approximate curve of each sloping angle relative to the measured value in the case of having the sloped face in both the inside annular part 20 and outside annular part 30 is shown by a solid line, the approximate curve of each sloping angle relative to the measured value in the case of having a sloped face only in the inside annular part 20 is shown by a one-dot chain line, and the approximate curve of each sloping angle relative to the measured value in the case of having the sloped face only in the outside annular part 30 is shown by a broken line. In addition, FIG. 7A is a graph from index evaluating the measured values of Example 1 relative to Comparative Example 1 for the maximum value of von Mises stress occurring in the inside annular part 20, and FIG. 7B is a graph from index evaluating the measured values of Example 1 relative to Comparative Example 1 for the maximum value of von Mises stress occurring in the outside annular part 30.

Figure 6A:
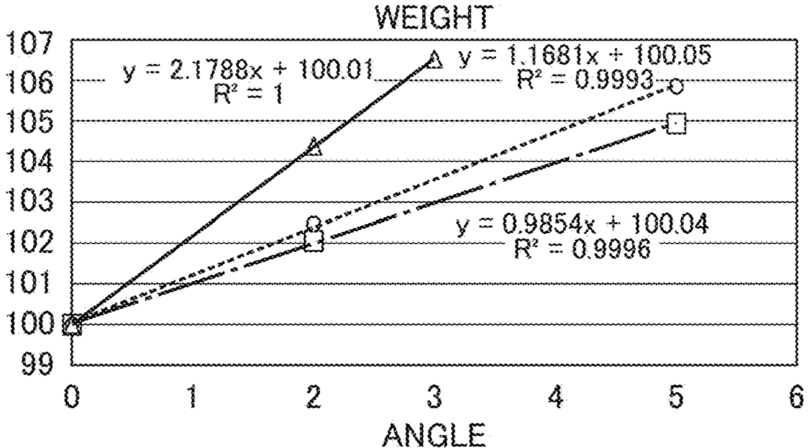
FIG. 6A is a graph comparing the weights in an analytical model of each tire of the Examples and Comparative Examples.
Figure 6B:
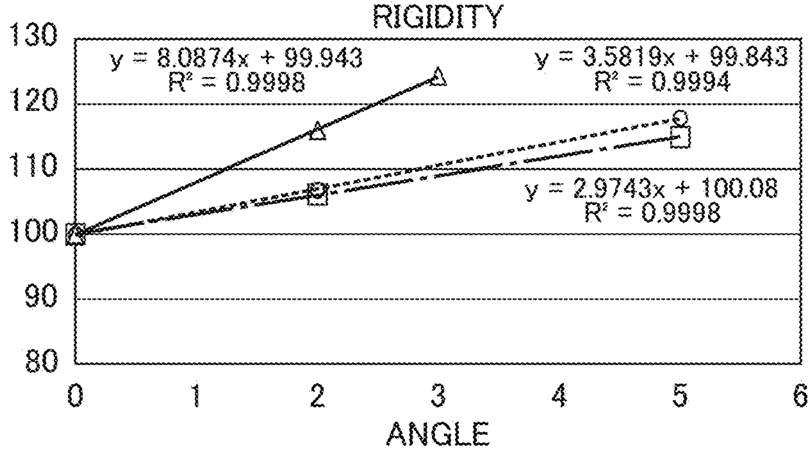
FIG. 6B is a graph comparing the rigidity in an analytical model of each tire of the Examples and Comparative Examples.
Figure 6C:
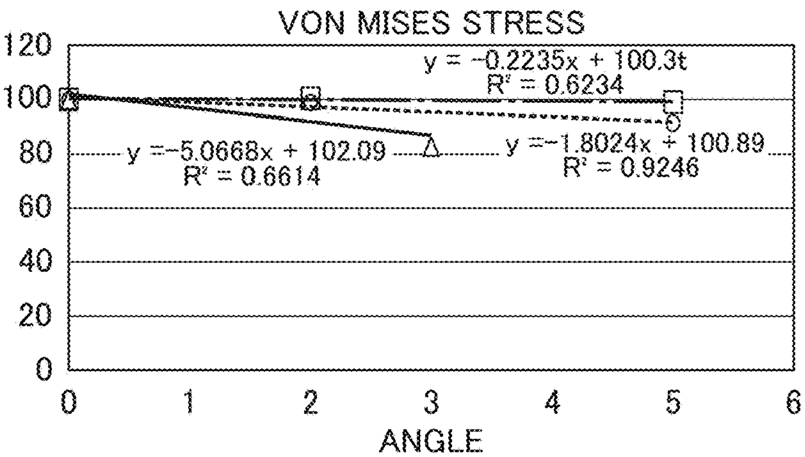
FIG. 6C is a graph comparing the von Mises stress in an analytical model of each tire of the Examples and Comparative Examples.
Figure 6D:
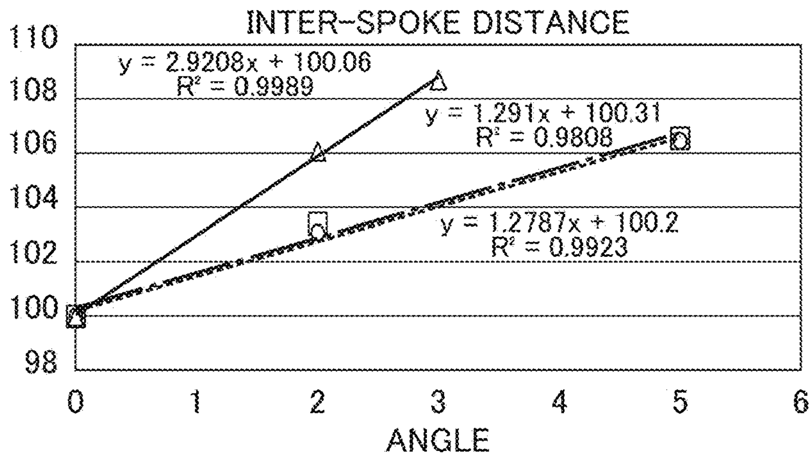
FIG. 6D is a graph comparing the inter-spoke distance in an analytical model of each tire of the Examples and Comparative Examples.
Figure 6E:
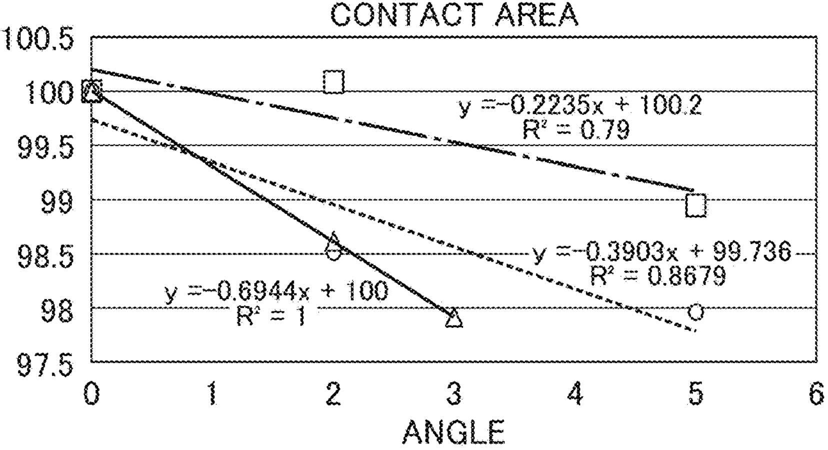
FIG. 6E is a graph comparing the contact area in an analytical model of each tire of the Examples and Comparative Examples.
Figure 6F:
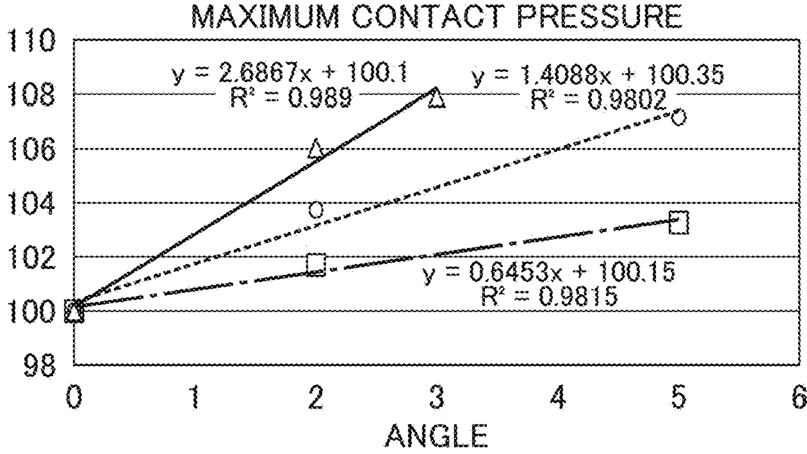
FIG. 6F is a graph comparing the maximum ground contact pressure in an analytical model of each tire of the Examples and Comparative Examples.
Figure 7A:
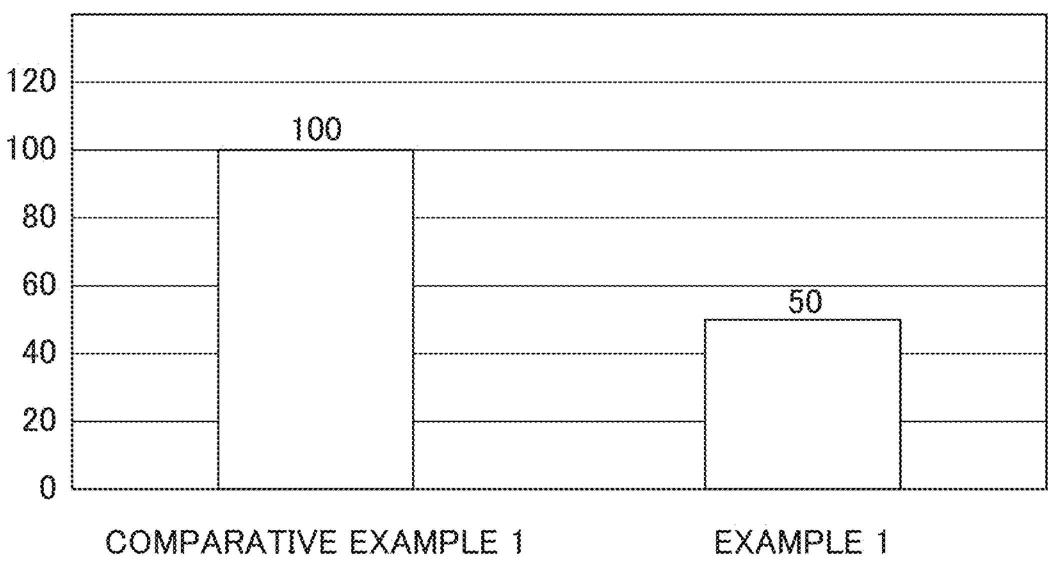
FIG. 7A is a graph comparing the maximum value of von Mises stress of an inside annular part in an analytical model of each tire of Example 1 and Comparative Example 1.
Figure 7B:
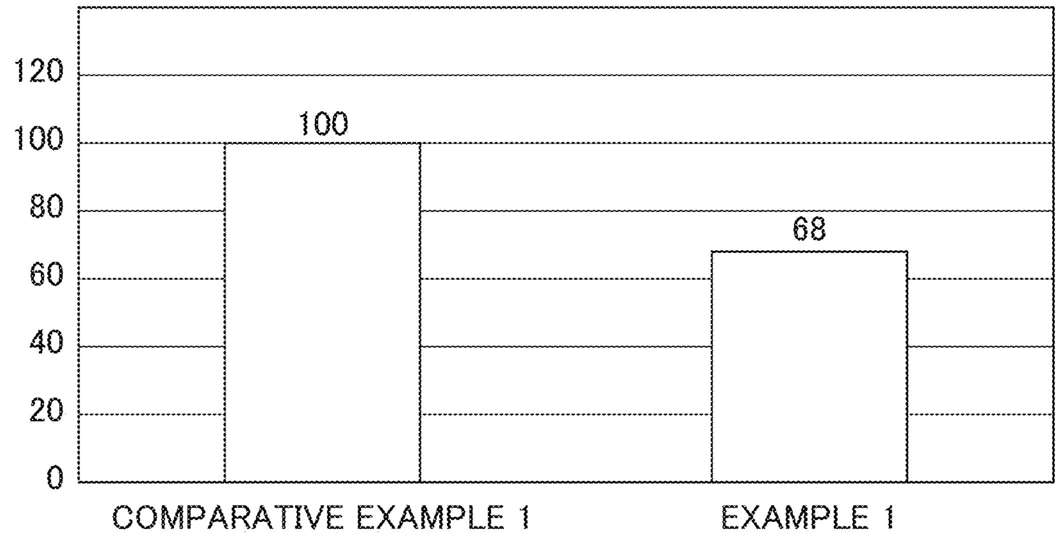
FIG. 7B is a graph comparing the maximum value of von Mises stress of an outside annular part in an analytical model of each tire of Example 1 and Comparative Example 1.

According to FIGS. 6A, 6B and 6C and Table 1, in Example 1, Example 2 and Comparative Examples 2 to 4, a greater improvement in rigidity, and greater reduction in Von Mises stress occurring at the spokes 40 were found with greater sloping angles of the inside sloped face 21 and outside sloped face 31, and the spoke durability improved. From such an improvement in rigidity of the tire and reduction in von Mises stress, it is found that the interval between spokes 40 is maintained. This seems to be caused by having the sloped face in each of the inside annular part 20 and outside annular part 30 (inside sloped face and outside sloped face), and having a shape in which the spokes 40 are continuous with these sloped faces via each of the inside continuous part and outside continuous part. In addition, according to FIGS. 7A and 7B, it was recognized that the von Mises stress occurring at the inside annular part 20 and outside annular part 30 also reduces, by the inside annular part 20 and outside annular part 30 respectively having the inside sloped face 21 and outside sloped face 31 having a sloping angle relative to the tire-width direction of 2°. From these results, the improvement in durability of the tire overall could be confirmed.

According to Table 1, regarding the rolling resistance, in Example 1 having the inside sloped face 21 and outside sloped face 31 having the sloping angle of 2°, the rolling resistance is reduced compared to Comparative Example 1 by the improvement in rigidity. On the other hand, although an improvement in rigidity of the tire and decline in von Mises stress are seen compared to Example 1 in Example 2 in which the sloping angle of the inside sloped face 21 and outside sloped face 31 is 3°, the suppressing effect in rolling resistance declined due to the increase in tire weight. In addition, in Example 2, the contact area is reduced, and maximum contact pressure increases, traction declines and ride comfort declines compared to Example 1. From these results, it could be confirmed that, by forming the sloped face in both the inside annular part 20 and outside annular part 30 (inside sloped face 21 and outside sloped face 31), and setting the sloping angles of the inside sloped face 21 and outside sloped face 31 to greater than 0° and less than 3°, the durability of the tire overall can be improved while maintaining favorable ride comfort.

In addition, according to FIGS. 6A, 6B and 6C and Table 1, it is found that Example 1 improved rigidity of the tire compared to Comparative Example 2 and Comparative Example 4 having a sloped face with a sloping angle of 2° relative to the tire-width direction in either of the inside annular part 20 and outside annular part 30, whereby the interval between the spokes 40 is maintained along with a reduction in von Mises stress. According to Table 1, particularly favorable effects were obtained for the spoke durability and rolling resistance from the improvement in rigidity, etc.

In addition, as shown in Table 1, with Comparative Example 2, the fitting characteristic with the rim improves compared to Comparative Example 1, and with Comparative Example 4, buckling and flat spotting are suppressed compared to Comparative Example 1. In contrast, with the examples having the inside sloped face 21 and outside sloped face 31, it exerts an effect of both an improvement in fitting characteristic with the rim and buckling and flat spotting suppression.

Although an embodiment of the present invention has been explained above, the present invention is not to be limited to the above embodiment, and even if conducting modifications, improvements, etc. in a scope which can achieve the object of the present invention, it shall be encompassed by the scope of the present invention.

For example, other than the form of sloping relative to the tire-radial direction, the spoke 40 may be a spoke extending straight along the tire-radial direction. In this case, the inside continuous part which is continuous to the inside sloped face 21 is provided to both sides in the tire-width direction of the inside connection part relative to the inside annular part 20, and an outside continuous part which is continuous to the outside sloped face 31 is provided to both sides in the tire-width direction of the outside connection part relative to the outside annular part 30.

What is claimed is:

1. A non-pneumatic tire, comprising:

an inside annular part;

an outside annular part disposed coaxially at an outer circumferential side of the inside annular part;

a plurality of spokes connecting the inside annular part and the outside annular part, the plurality of spokes arranged along a tire-circumferential direction; and a tread provided at an outer circumferential surface of the outside annular part, wherein a pair of inside sloped faces approaching the outside annular part from both ends in a tire-width direction towards the tire-width direction center is formed at an outer circumferential part of the inside annular part opposing the outside annular part, a pair of outside sloped faces approaching the inside annular part from both ends in the tire-width direction towards the tire-width direction center is formed at an inner circumferential part of the outside annular part opposing the inside annular part, each spoke in the plurality of spokes has an intermediate part extending between the inside annular part and the outside annular part, an inside connection part that connects the intermediate part and the inside annular part, and an outside connection part connecting the intermediate part and the outside annular part, the inside connection part includes an inside continuous part having a shape continuously linking to the inside sloped face, and the outside connection part includes an outside continuous part having a shape continuous to the outside sloped face.

2. The non-pneumatic tire according to claim 1, wherein the inside sloped face and the outside sloped face are sloping at an angle greater than 0° and less than 3° relative to the tire-width direction.

3. The non-pneumatic tire according to claim 2, wherein the inside sloped face and the outside sloped face slope at an angle no greater than 2° relative to the tire-width direction.

4. The non-pneumatic tire according to claim 3, wherein the intermediate part of each spoke extends to slope relative to a tire-radial direction when viewing from the tire-circumferential direction, wherein the inside continuous part is provided at a side of the inside connection part at which an angle formed by the intermediate part and the inside annular part makes an acute angle, and wherein the outside continuous part is provided at a side of the outside connection part at which an angle formed by the intermediate part and the outside annular part makes an acute angle.

5. The non-pneumatic tire according to claim 4, wherein the inside sloped face extends to both ends in the tire-width direction of the inside annular part, and wherein the outside sloped face extends to both ends in the tire-width direction of the outside annular part.

6. The non-pneumatic tire according to claim 3, wherein the inside sloped face extends to both ends in the tire-width direction of the inside annular part, and wherein the outside sloped face extends to both ends in the tire-width direction of the outside annular part.

7. The non-pneumatic tire according to claim 3, wherein each of the inside sloped face and the outside sloped face are flat.

8. The non-pneumatic tire according to claim 3, wherein the plurality of spokes include:

a first spoke at which the intermediate part slopes to one side in the tire-axial direction, and a second spoke at which the intermediate part slopes to the opposite side than the first spoke, wherein the first spoke and the second spoke are alternately disposed in the tire-circumferential direction.

9. The non-pneumatic tire according to claim 2, wherein the intermediate part of each spoke extends to slope relative to a tire-radial direction when viewing from the tire-circumferential direction, wherein the inside continuous part is provided at a side of the inside connection part at which an angle formed by the intermediate part and the inside annular part makes an acute angle, and wherein the outside continuous part is provided at a side of the outside connection part at which an angle formed by the intermediate part and the outside annular part makes an acute angle.

10. The non-pneumatic tire according to claim 9, wherein the inside sloped face extends to both ends in the tire-width direction of the inside annular part, and wherein the outside sloped face extends to both ends in the tire-width direction of the outside annular part.

11. The non-pneumatic tire according to claim 9, wherein each of the inside sloped face and the outside sloped face are flat.

12. The non-pneumatic tire according to claim 2, wherein the inside sloped face extends to both ends in the tire-width direction of the inside annular part, and wherein the outside sloped face extends to both ends in the tire-width direction of the outside annular part.

13. The non-pneumatic tire according to claim 2, wherein each of the inside sloped face and the outside sloped face are flat.

14. The non-pneumatic tire according to claim 2, wherein the plurality of spokes include:

a first spoke at which the intermediate part slopes to one side in the tire-axial direction, and a second spoke at which the intermediate part slopes to the opposite side than the first spoke, wherein the first spoke and the second spoke are alternately disposed in the tire-circumferential direction.

15. The non-pneumatic tire according to claim 1, wherein the intermediate part of each spoke extends to slope relative to a tire-radial direction when viewing from the tire-circumferential direction, wherein the inside continuous part is provided at a side of the inside connection part at which an angle formed by the intermediate part and the inside annular part makes an acute angle, and wherein the outside continuous part is provided at a side of the outside connection part at which an angle formed by the intermediate part and the outside annular part makes an acute angle.

16. The non-pneumatic tire according to claim 15, wherein the inside sloped face extends to both ends in the tire-width direction of the inside annular part, and wherein the outside sloped face extends to both ends in the tire-width direction of the outside annular part.

17. The non-pneumatic tire according to claim 15, wherein each of the inside sloped face and the outside sloped face are flat.

18. The non-pneumatic tire according to claim 1, wherein the inside sloped face extends to both ends in the tire-width direction of the inside annular part, and wherein the outside sloped face extends to both ends in the tire-width direction of the outside annular part.

19. The non-pneumatic tire according to claim 1, wherein each of the inside sloped face and the outside sloped face are flat.

20. The non-pneumatic tire according to claim 1, wherein the plurality of spokes include:

a first spoke at which the intermediate part slopes to one side in the tire-axial direction, and a second spoke at which the intermediate part slopes to the opposite side than the first spoke, wherein the first spoke and the second spoke are alternately disposed in the tire-circumferential direction.

* * * * *